United States Patent
Ando et al.

(10) Patent No.: US 6,392,977 B2
(45) Date of Patent: *May 21, 2002

(54) OPTICAL PICKUP WITH A HOLOGRAM TO LIMIT THE APERTURE OF TWO LIGHT BEAMS WITH DIFFERENT WAVELENGTHS

(75) Inventors: Nobuhiko Ando, Tokyo; Kazuhiko Fujiie, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/445,695
(22) PCT Filed: Apr. 14, 1999
(86) PCT No.: PCT/JP99/01991
  § 371 Date: Dec. 13, 1999
  § 102(e) Date: Dec. 13, 1999
(87) PCT Pub. No.: WO99/54874
  PCT Pub. Date: Oct. 28, 1999

(30) Foreign Application Priority Data

Apr. 15, 1998 (JP) .................................. 10-105027

(51) Int. Cl.[7] .................................. G11B 7/00
(52) U.S. Cl. .............. 369/112.01; 369/44.37; 369/94; 369/118
(58) Field of Search ................ 369/112, 44.23, 369/44.37, 103, 109, 118, 44.24, 94, 112.17, 112.1, 112.02, 112.06, 13.3, 44.21, 44.41, 44.42; 359/15, 488

(56) References Cited

U.S. PATENT DOCUMENTS

| 4,935,911 A | * | 6/1990 | Ohuchida et al. .......... 369/13.3 |
|---|---|---|---|
| 4,993,789 A | * | 2/1991 | Biles et al. .................. 369/103 |
| 5,665,957 A | * | 9/1997 | Lee et al. ................... 369/118 |
| 5,696,750 A | | 12/1997 | Katayama ..................... 369/54 |
| 5,703,856 A | | 12/1997 | Hayashi et al. ............... 369/54 |
| 5,748,603 A | * | 5/1998 | Kim et al. ............. 369/112.02 |
| 5,912,686 A | * | 6/1999 | Hayashi et al. ............. 369/118 |
| 5,923,635 A | * | 7/1999 | Yamanaka ............... 369/112.2 |
| 5,923,636 A | * | 7/1999 | Haruguchi et al. ......... 369/112 |

(List continued on next page.)

FOREIGN PATENT DOCUMENTS

| JP | 06259804 A | | 9/1994 |
|---|---|---|---|
| JP | 09-054973 A | * | 2/1997 |
| JP | 09054973 A | * | 2/1997 |

Primary Examiner—David Hudspeth
Assistant Examiner—Kim-Kwok Chu
(74) Attorney, Agent, or Firm—Jay H. Maioli

(57) ABSTRACT

An optical pickup device that is able to record/reproduce information signals for first and second optical discs with different recording capacities. The optical pickup device includes an objective lens for converging first and second light beams of different wavelengths on the signal recording layers of first and second optical discs having different substrate thicknesses, a beam splitter having the same transmittance to the first and second light beams and configured for separating the first and second light beams radiated by first and second light sources to fall on the beam splitter via a first objective lens or a second objective lens, and a hologram element arranged between the objective lens and the beam splitter for limiting the aperture of one of the first light beam and the second light beam and for correcting the spherical aberration caused by difference in the disc substrate thickness of the first and second optical discs. This configuration enables various optical elements, such as objective lens or beam splitter, to be used in common for the optical disc of different recording capacities.

15 Claims, 4 Drawing Sheets

U.S. PATENT DOCUMENTS 5,940,360 A * 8/1999 Choi .......................... 369/112
5,978,346 A * 11/1999 Mizuno et al. ............. 369/103
5,991,255 A * 11/1999 Takahashi .................. 369/112
6,049,518 A * 4/2000 Tsuchiya et al. ............ 369/112
6,052,353 A * 4/2000 Fujita ......................... 369/112
6,052,355 A * 4/2000 Saito et al. .................. 369/112

* cited by examiner

OPTICAL PICKUP WITH A HOLOGRAM TO LIMIT THE APERTURE OF TWO LIGHT BEAMS WITH DIFFERENT WAVELENGTHS

TECHNICAL FIELD

This invention relates to an optical pickup device used for recording information signals on an optical disc or reproducing information signals recorded on the optical disc, and an optical disc recording and/or reproducing apparatus employing this optical pickup device. More particularly, it relates to the optical pickup device and the recording and/or reproducing apparatus for selectively recording and/or reproducing information signals for first and second optical discs of different recording densities using two light beams having different wavelengths.

BACKGROUND ART

The optical discs may be classified into a first optical disc of a standard recording density and a second optical disc that is able to record the information signals to a higher recording density than the first optical disc. In the second optical disc, the interval between neighboring pits formed on a substrate is set so as to be narrower than that in the first optical disc, the pit size is reduced, or the track pitch of the recording tracks constituted by pit strings is reduced, for achieving high recording density. In the second optical disc, having the high recording density, the spot diameter of a light beam on a signal recording surface for recording or reproducing information signals needs to be smaller than that of the light beam on the signal recording surface of the first optical disc. To this end, the optical pickup device used for recording or reproducing information signals for the second optical disc uses a light source radiating a light beam of a wavelength shorter than that of the light beam used for the first optical disc and an objective lens having a numerical aperture NA larger than that of an objective lens used for the first optical disc.

On the other hand, since the optical pickup device for recording information signals on the second optical disc or reproducing information signals recorded on the second optical disc employs an objective lens with a larger numerical aperture, the substrate of the second optical disc needs to be thinner in thickness than that of the first optical disc in order to assure tilting tolerance of the optical disc loaded on a disc rotating mechanism and which is run in this state in rotation. If, in such a case, an optical pickup device for the second optical disc is used to record/reproduce the information signals or the first optical disc, spherical aberration is produced because of the substrate of the first optical disc being thicker in thickness than the substrate of the second optical disc to render it impossible to record or reproduce correct information signals.

Meanwhile, in a disc recording and/or reproducing apparatus, employing an optical disc as a recording medium, it is desired that first and second optical discs having different recording densities be recorded and/or reproduced on a common deck. For reproducing the first and second optical discs on the common recording and/or reproducing apparatus, it is contemplated to have an optical pickup for the first optical disc and an optical pickup for the second optical disc built into the apparatus, to discriminate the optical disc type by a discriminating unit, adapted for discriminating the disc type, and to switch between the optical pickup devices based on the result of discrimination.

There has also been proposed an apparatus adapted for recording or reproducing information signals for the first and second optical discs of different recording densities using an optical pickup employing a common light source and a common objective lens. The optical pickup device, used in this apparatus, includes a light source for radiating a light beam used for the second optical disc, an objective lens of a larger numerical aperture, used for the second optical disc, and a light stop mechanism for mechanically limiting the aperture of the objective lens when recording and/or reproducing the first optical disc. When recording or reproducing information signals for the first optical disc, the optical pickup device limits the objective lens aperture by the light stop mechanism to give a spot diameter suited to the recording density of the first optical disc, corrects the spherical aberration caused by the first optical disc being thinner in substrate thickness than the second optical disc, and illuminates a light beam on a signal recording surface of the first optical disc. When recording or reproducing the information signals for the second optical disc, the optical pickup device illuminates a light beam on the signal recording surface of the second optical disc without limiting the objective lens aperture by the light stop mechanism.

Meanwhile, if both the optical pickup device for the first optical disc and the optical pickup device for the second optical disc are built into a sole disc recording and/or reproducing apparatus, the apparatus itself is bulky in size to render it difficult to reduce the apparatus size.

Also, in the optical pickup device in which, for recording or reproducing information signals by a common optical pickup device for the first and second optical discs having different substrate thicknesses and different recording densities, there is provided a mechanical stop mechanism for limiting the objective lens aperture, the structure of the optical pickup device is complicated to render it difficult to reduce the device size.

DISCLOSURE OF THE INVENTION

It is an object of the present invention to provide a novel optical pickup device and a novel optical disc recording and/or reproducing apparatus which can be used in common for optical discs with different recording densities.

It is another object of the present invention to provide a novel optical pickup device and a novel optical disc recording and/or reproducing apparatus, which can be used in common for different optical discs of different recording densities, can be simplified in structure and reduced further in size.

It is still another object of the present invention to provide a novel optical pickup device and a novel optical disc recording and/or reproducing apparatus which allows for correct recording or reproduction of information signals for any optical discs having different recording densities.

It is yet another object of the present invention to provide a novel optical pickup device and a novel optical disc recording and/or reproducing apparatus which, even if optional optical discs with different recording densities are used, correct focussing error signals and tracking error signals can be produced, and which allows a light beam to scan a recording track of an optional optical disc to assure correct recording or reproduction of information signals.

For accomplishing the above objects, the present invention provides an optical pickup device including a first light source for radiating a first light beam, a second light source for radiating a second light beam having a wavelength different from that of the first light beam, an objective lens for converging the light beam radiated by the first light source or the light beam radiated by the second light source, a beam splitter having substantially the same transmittance to the light beam radiated by the first light source and to the light beam radiated by the second light source and adapted for separating the light beam radiated by the first light source or the light beam radiated by the second light source from the first light beam or the second light beam incident via the objective lens, and a hologram element arranged between the objective lens and the beam splitter for limiting the aperture of the first light beam or the second light beam and for correcting the spherical aberration.

The beam splitter has transmittances for the P polarization component and the S polarization component of the first light beam and the second light beam of 70% to 80% and 0% to 10%, respectively. Also, in the wavelengths of the first light beam, the phase difference between the P and S polarization components and the second light beam is larger than 10°.

The optical pickup device according to the present invention also includes a phase compensation element for compensating the phase difference between the P polarization component and the S polarization component of the first light beam or the second light beam, reflected by an optical disc to fall on the beam splitter via an objective lens so as to be separated by the beam splitter, and a photodetector for receiving the first light beam or the second light beam transmitted through the phase compensation element.

The photodetector receiving the first or second light beam, compensated for phase difference between the P polarization component and the S polarization component by the phase compensation element, is able to detect the light beam accurately.

The optical pickup device according to the present invention also includes a diffraction grating for generating at least three diffracted light beams from the first light beam radiated from the first or the light beam radiated from the second light source, and detects tracking errors by the three-beam method.

The optical pickup device according to the present invention includes a further beam splitter arranged on an optical path between the first and second light sources and the beam splitter for reflecting at least one of the first light beam radiated by the first light source and the second light beam radiated by the second light source and for transmitting the other light beam.

An optical disc recording/reproducing apparatus according to the present invention includes the above defined optical pickup device, a focussing error signal generating unit for generating focussing error signals based on an output signal from a photodetector provided on the optical pickup device and/or a tracking error signal generating unit for generating tracking error signals based on an output signal from a photodetector provided on the optical pickup device. The objective lens position is controlled based on the focussing error signals and/or the tracking error signals outputted by the focussing error signal generating unit and the tracking error signal generating unit, while the light beam focussing position and the illuminating position of the light beam on the signal recording surface of the first or second optical disc is controlled by this objective lens to realize accurate scanning of the recording tracks by the light beam.

Other objects and advantages of the present invention will become apparent from the following description of the preferred embodiments of the invention.

BEST MODE FOR CARRYING OUT THE INVENTION

Figure 1:
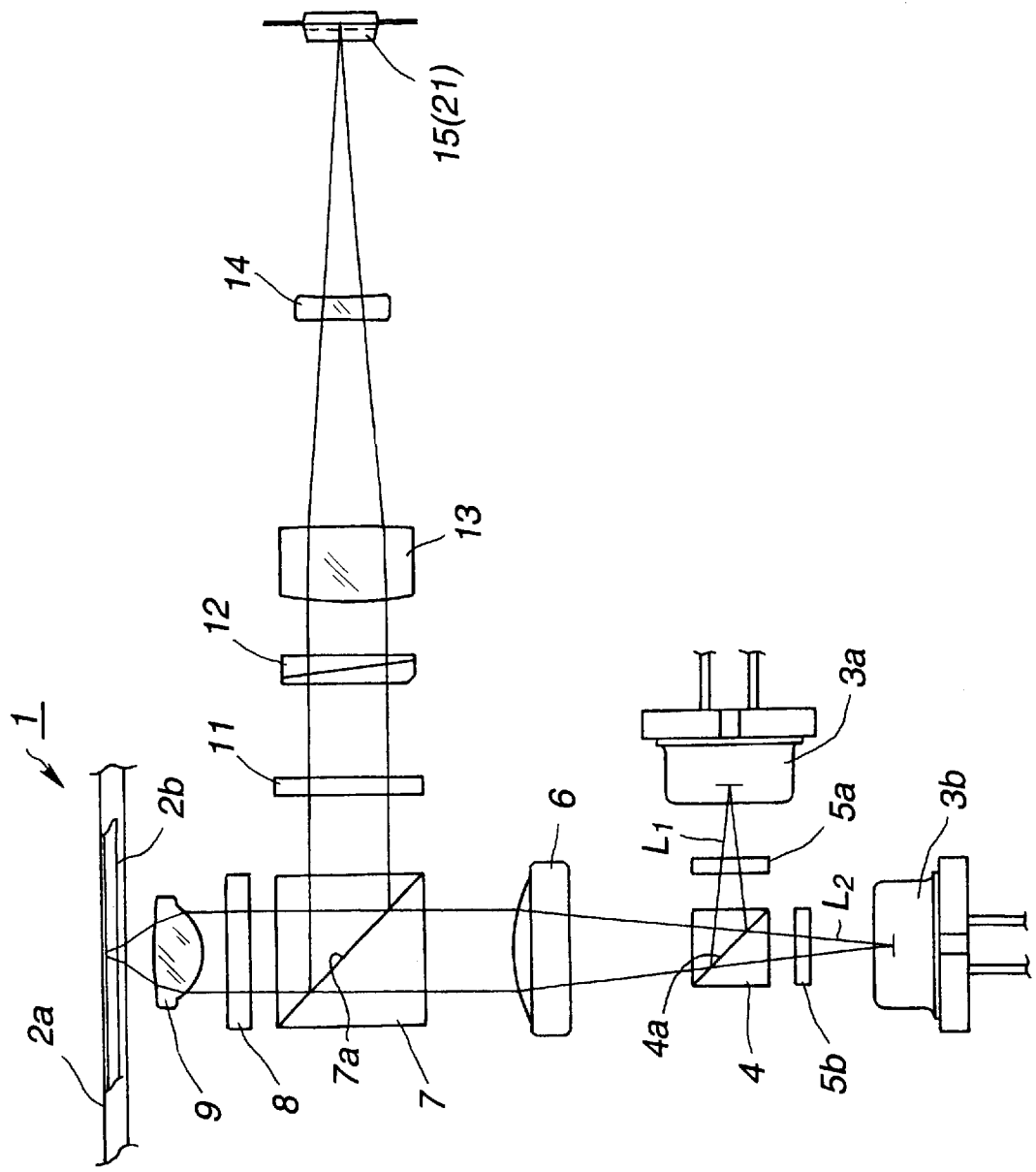
FIG. 1 is a side view showing a first embodiment of an optical pickup device according to the present invention.

Referring to the drawings, an optical pickup device according to the present invention is explained in detail.

FIG. 1 shows a first embodiment of an optical pickup device 1 according to the present invention. This optical pickup device enables the information signals to be selectively recorded or reproduced on a first optical disc 2a or a second optical disc 2b having different recording densities.

The first optical disc 2a, used as a recording medium for a recording and/or reproducing apparatus, having arranged therein the optical pickup device 1 according to the present invention, is of a substrate thickness of approximately 1.2 mm, and is configured so that information signals are recorded thereon at a standard recording density and so that information signals are recorded or reproduced using a first light beam of approximately 780 nm. The second optical disc 2b is of a substrate thickness of approximately 0.6 mm thinner than that of the first optical disc 2a, and is configured so that information signals are recorded thereon at a recording density higher than that of the first optical disc 2a and so that information signals are recorded or reproduced using a second light beam of approximately 410 nm.

The second optical disc 2a may be comprised of two substrates approximately 0.6 in thickness, bonded together with signal recording surfaces of the two substrates bonded together to give an overall thickness substantially equal to that of the substrate of the first optical disc 2a. As the first optical disc 2a and the second optical disc 2b, a read-only optical disc, having a reflective surface and a protective surface formed on a substrate carrying pit strings, a magneto-optical disc on a substrate of which a dielectric film, a signal recording layer formed by a perpendicular recording film, a reflective film and a protective film are formed to enable recording of information signals, or a phase change optical disc, on the substrate of which a signal recording layer of a phase change material, a reflective film and a protective film are formed to enable recording of information signals, may be used.

The substrate of each of the first and second optical discs 2a, 2b is formed using a synthetic resin, such as polycarbonate resin, exhibiting light transmitting properties.

The optical pickup device 1 for selectively recording or reproducing information signals includes a first semiconductor laser 3a for radiating a first light beam L1 used for recording or reproducing information signals for the first optical disc 2a, and a second semiconductor laser 3b for radiating a second light beam L2 used for recording or reproducing information signals for the second optical disc 2b, as shown in FIG. 1. The first semiconductor laser 3a and the second semiconductor laser 3b are arranged so that optical axes of the first and second light beams L1, L2 will cross each other.

The first semiconductor laser 3a is adapted to generate the first light beam L1 of a wavelength of approximately 780 nm, used for recording or reproducing information signals for the first optical disc 2a, and is arranged on the right side in FIG. 1 so that the first light beam L1 will cross the optical axis of an objective lens 9 which will be explained subsequently. The second semiconductor laser 3b, configured for generating a second light beam L2 of a wavelength of approximately 410 nm, used for recording or reproducing information signals for the second optical disc 2b, is arranged on the lower side in FIG. 1 so that the second light beam L2 will be parallel to the optical axis of the objective lens 9. The first semiconductor laser 3a and the second semiconductor laser 3b are controlled so that the laser power will be higher for recording the information signals than for reproducing the information signals.

At crossing point between the optical axes of the first and second light beams L1, L2, there is provided a dichroic beam splitter 4 for deflecting the first light beam L1 radiated from the first semiconductor laser 3a by 90° and for transmitting the second light beam L2 radiated from the second semiconductor laser 3b to permit the first and second light beams L1, L2 to fall on the objective lens 9.

The dichroic beam splitter 4 has a light polarizing film 4a on a surface inclined at 45° relative to the optical axis of the first light beam L1. The light polarizing film 4a has a light reflectance of approximately 100% to the first light beam L1 radiated from the first semiconductor laser 3a, while having transmittance of approximately 100% to the second light beam L2 radiated from the second semiconductor laser 3b. The dichroic beam splitter 4 deflects the first light beam L1, radiated from the first semiconductor laser 3a, by 90°, while transmitting the second light beam L2, radiated from the second semiconductor laser 3b, to provide coincident light paths for the first light beam L1 and the second light beam L2.

Between the dichroic beam splitter 4 and the first semiconductor laser 3a, there is mounted a first diffraction grating 5a, whereas, between the dichroic beam splitter 4 and the second semiconductor laser 3b, there is provided a second diffraction grating 5b. The first diffraction grating 5a splits the first light beam L1 radiated from the first semiconductor laser 3a into at least three diffracted light beams, that is the 0th order light beam and the ±first order light beams, at equal intervals from each other, while the second diffraction grating 5b splits the second light beam L2 radiated from the second semiconductor laser 3b into at least three diffracted light beams, that is the 0th order light beam and the ±first order light beams, at equal intervals from each other. In FIG. 1, the three diffracted light beams are represented as a sole light beam for simplicity and referred to below simply as a light beam in agreement with the illustration in the drawing.

The optical pickup device 1 includes, looking from the light source side, a collimator lens 6 for collimating the first light beam L1 and the second light beam L2 from the dichroic beam splitter 4, a beam splitter 7 having substantially the same transmittance and the same reflectance to the first light beam L1 and the second light beam L2 of different wavelengths from the collimator lens 6, a dichroic hologram 8 for limiting the aperture of the objective lens 9 for the first light beam L1 transmitted through the beam splitter 7 for correcting the spherical aberration and an objective lens 9 for converging the first and second light beams L1, L2 for illumination on the signal recording surface of the first optical disc 2a or the second optical disc 2b.

Figure 2:
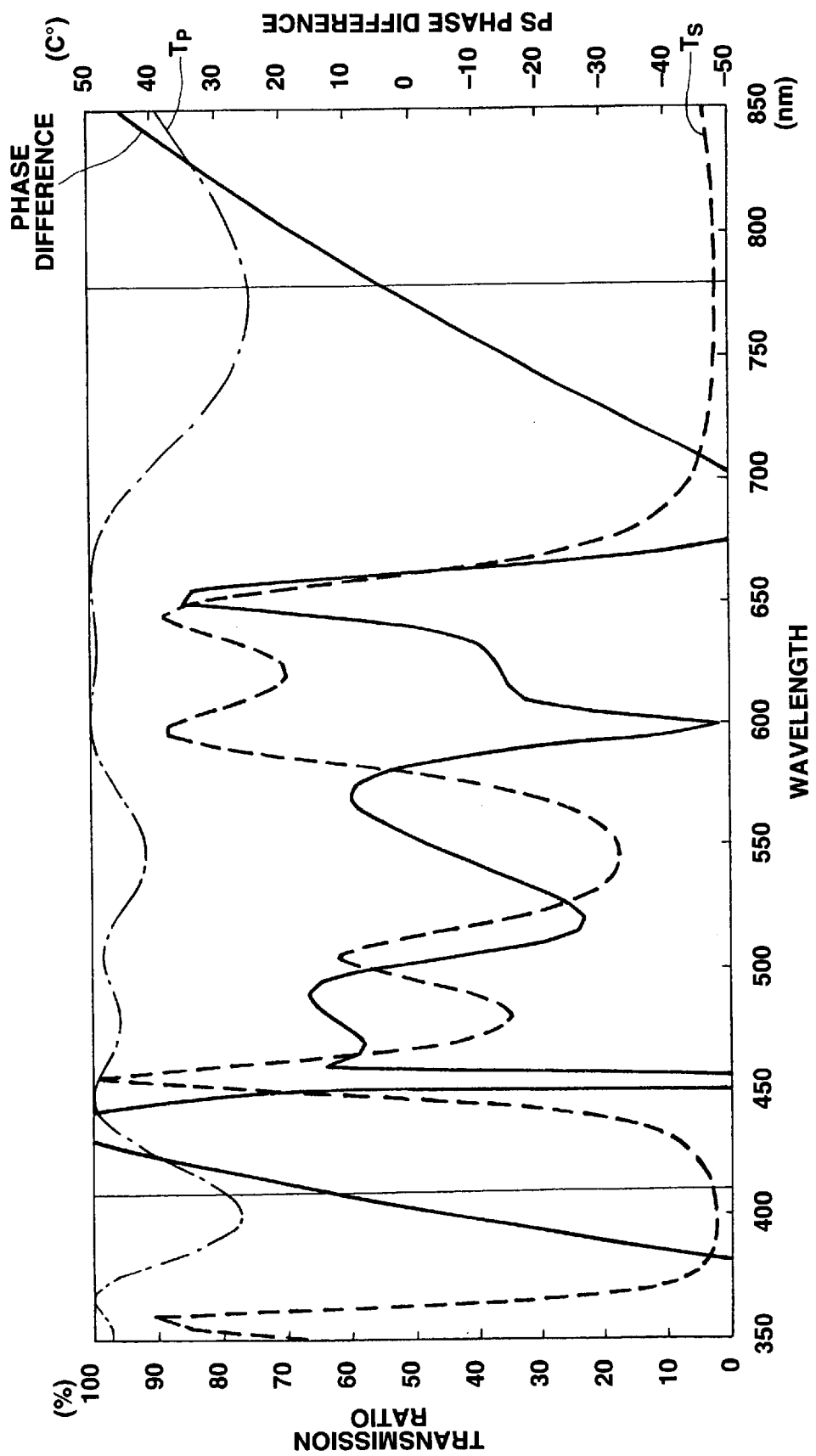
FIG. 2 is a graph showing optical characteristics of a beam splitter used in an optical pickup device according to the present invention.

The beam splitter 7, on which fall the first and second light beams L1, L2; collimated by the collimator lens 6, has a light polarizing film 7a on a plane inclined 45° relative to the optical axes of the first and second light beams L1, L2. The light polarizing film 7a of the beam splitter 7 transmits the first and second light beams L1, L2 from the collimator lens 6 to cause the beams to fall on the objective lens 9, while deflecting the first and second light beams L1, L2, reflected back from the first optical disc 2a or the second optical disc 2b and returned from the dichroic hologram 8, by 90° towards the photodetector side. That is, the beam splitter 7 has approximately the same transmittance and reflectance for the first and second light beams L1, L2 of different wavelengths. Specifically, the beam splitter 7 has the light transmittance Tp of the P polarization component of the first and second light beams L1, L2 of 70 to 80% and the light transmittance Ts of the S polarization component of 0 to 10%, as shown in FIG. 2. The phase difference between the P polarization component and the S polarization component in the beam splitter 7 is 10° or less in the wavelength of the first light beam L1.

The dichroic hologram 8 has wavelength selectivity and limits the aperture of the first light beam L1 from the beam splitter 7 to correct the spherical aberration. Specifically, the dichroic hologram 8 is a hologram element transmitting not less than 90% of the diffracted light of the 0th order light of the second light beam L2 and not more than a few percent of the other diffracted light, while transmitting not less than 70% of the diffracted light of the first order light of the first light beam L1 and not more than a few percent of the other diffracted light. The diffraction grating pattern of a hologram element constituting the dichroic hologram 8 is shaped such as to correct the spherical aberration produced due to the thickness of the substrate of the first optical disc 2a being larger than that of the second optical disc 2b on illuminating the first light beam L1 on the signal recording surface of the first optical disc 2a. The diffraction grating pattern of the hologram element constituting the dichroic hologram 8 is formed for a range such that the diffraction grating pattern will be smaller than the aperture when the second light beam L2 is illuminated on the second optical disc 2b so that the numerical aperture of the objective lens 9 will be optimum when the first light beam L1 is illuminated on the first optical disc 2a.

The objective lens 9 is arranged facing the signal recording surface of the first optical disc 2a or that of the second optical disc 2b, and operates for converging the first and second light beams L1, L2 from the dichroic hologram 8 for illumination on the signal recording surface of the first optical disc 2a or the second optical disc 2b. The numerical aperture NA of the objective lens 9 is set so as to be smaller than the spot diameter for the optical disc 2b in meeting with that for the second optical disc 2b. The spot diameter S is determined by the following formula:

spot diameter (S)∝wavelength (λ)/numerical aperture (NA).

In recording or reproducing information signals on or from the first optical disc 2a, the aperture of the objective lens 9 is limited by the above-mentioned dichroic hologram 8 to correct the spherical aberration caused by the difference in thicknesses of the substrates of the first optical disc 2a or the second optical disc 2b.

The first and second return light beams L1, L2, illuminated on the signal recording surfaces of the first optical disc 2a or the second optical disc 2b and reflected back therefrom, are transmitted through the objective lens 9 and the dichroic hologram 8 to fall on the photodetector as the S polarization component thereof is deflected 90° by the beam splitter 7. The optical pickup device 1 includes, looking from the beam splitter 7, a dichroic phase compensation plate 11, a Wallastone prism 12, a light converging lens 13, a multiple lens 14 and a photodetector 15. The dichroic phase compensation plate 11 corrects the phase difference of the P and S polarization components of the first and second light beams L1, L2. The Wallastone prism 12 splits the first and second light beams L1, L2 depending on the direction of polarization of the first and second light beams L1, L2. The light converging lens 13 converges the light on the photodetector 15, while the multiple lens 14 produces astigmatic aberration in the first and second light beams L1, L2. On the photodetector 15 are incident the first and second light beams L1, L2 from the multiple lens 14.

The dichroic phase compensation plate 11 is formed by a uniaxial crystal plate having a thickness such that, if the phase difference between the P and S polarization components of the first and second light beams L1, L2 reflected by the beam splitter 7 is 0° for the second light beam L2 and other than 0° for the first light beam L1, no phase difference is produced for the second light beam L2 and the phase difference produced in the beam splitter 7 is cancelled for the first light beam L1.

The Wallastone prism 12 split the first light beam L1 and the second light beam L2, made up of the 0th order light beam and the ±first order light beams, into a first light beam L1 not having polarization dependency and into two light beams having polarization dependency, thus producing nine beams.

The first and second light beams L1, L2 are each split so that two light beams having polarization dependency are located on both sides of the light beam not having polarization dependency, that is with the light beam not having polarization dependency as center. The light beams not having polarization dependency is used for focussing error detection and tracking error detection as later explained, while the light beam having polarization dependency is used for reading out the information signals recorded on the first optical disc 2a and the second optical disc 2b.

Figure 3:
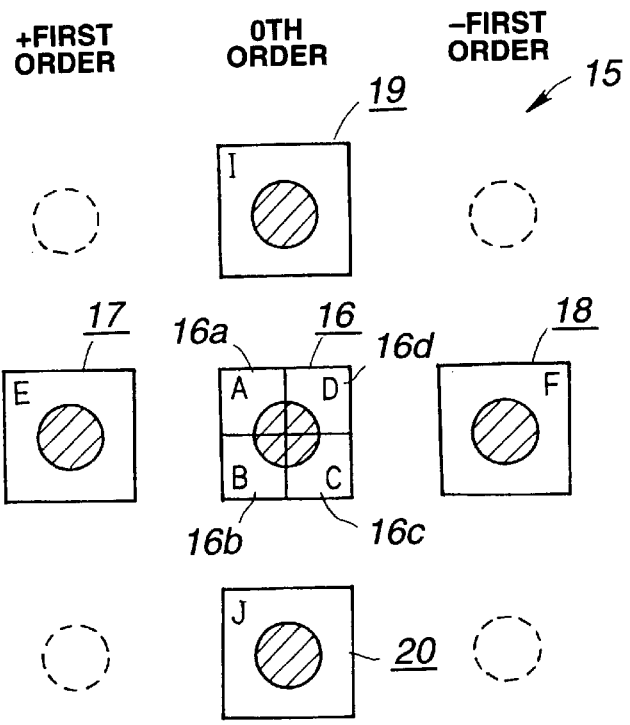
FIG. 3 is a plan view showing a light receiving surface of a photodetector used on an optical pickup device according to the present invention.

The photodetector 15, on which fall the first and second light beams L1, L2 from the multiple lens 14, is comprised of a photodetector device, such as a photodiode. The photodetector 15 has its light receiving surface split into first to fifth light receiving sections 16 to 20, as shown in FIG. 3. Based on a detection output, received by these light receiving sections 16 to 20, the photodetector 15 detects the information signals recorded on the first optical disc 2a or the second optical disc 2b, to generate focussing error signals FE and tracking error signals TE. Meanwhile, the first to third light receiving sections 16 to 18 are irradiated with the light beams of the 0th order light and the ±first order light, split by the Wallastone prism 12, and not exhibiting polarization dependency, while the fourth and fifth light receiving sections 19, 20 are irradiated with two light beams of the 0th order light exhibiting polarization dependency. That is, the four split light beams from the ±first order light, exhibiting polarization dependency, are illuminated on an area of the photodetector 15 not carrying the light receiving sections, as shown in FIG. 3, and hence are not used for signal detection.

The first light receiving section 16 has its light receiving surface divided in a cruciform shape into four sub-sections, that is a first light receiving area 16a, a second light receiving area 16b, a third light receiving area 16c and a fourth light receiving area 16d, for generating the focussing error signals FE. The first to fourth light receiving areas 16a to 16d are configured to produce output signals A, B, C and D based on respective received light quantities. The second light receiving section 17 and the third light receiving section 18 are configured for generating output signals E and F, based on respective received light quantities, for generating tracking error signals TE. The fourth light receiving section 19 and the fifth light receiving section 20 are configured for detecting the ratio of polarization of the first and second return light beams L1, L2 to produce output signals I and J to generate information signals RF recorded on the first optical disc 2a and on the second optical disc 2b. The focussing error signals FE are obtained from the output signals A to D of the photodetector 15, using the astigmatic method, in accordance with the following formula:

$$FE=(A+C)-(B+D) \qquad (1)$$

while the tracking error signals TE are obtained from the output signals E and F of the photodetector 15, using the three-beam method, in accordance with the following formula:

$$TE=(E-F) \qquad (2).$$

The information signals RF are obtained based on output signals I and J.

If the first optical disc 2a and the second optical disc 2b are provided with signal recording layers of the read-only discs or the phase-change type signal recording layers, the information signals RF are obtained in accordance with the following formula:

$$RF=(I+J) \qquad (3\text{-}1).$$

If the first optical disc 2a and the second optical disc 2b are magneto-optical discs, the information signals RF are obtained in accordance with the following formula:

$$RF=(I-J) \qquad (3\text{-}1).$$

The photodetector 15 may be provided only with the first to third light receiving sections 16, 18 and 19 without being provided with the fourth and fifth light receiving sections 19 and 20. The information signals RF may also be produced by adding the output signals A to D from the first to third light receiving sections 16, 17 and 18.

Figure 4:
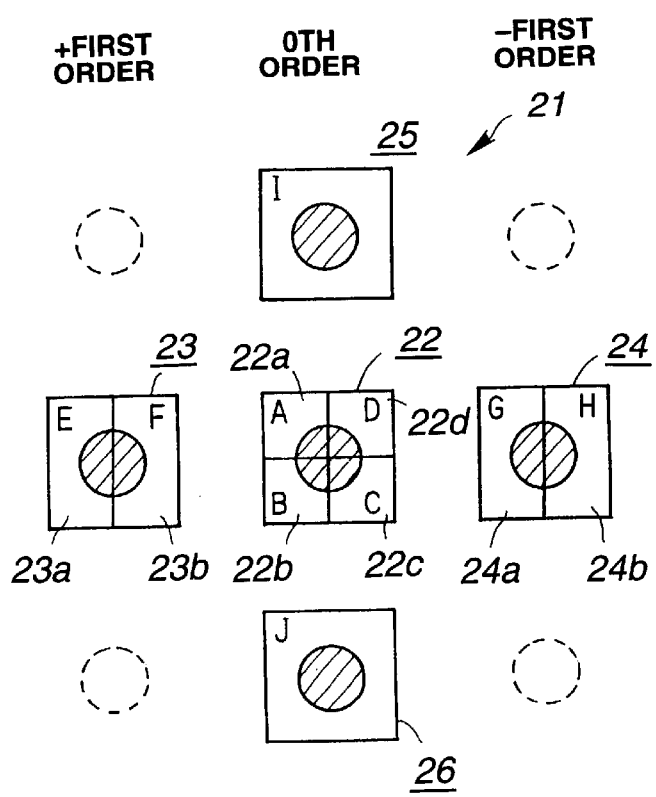
FIG. 4 is a plan view showing another embodiment of the light receiving surface of the photodetector.

The photodetector may also be configured by a photodetector 21 substantially as follows: The photodetector 21 is provided with first to fifth light receiving sections 22, 23, 24, 25 and 26 for detecting information signals recorded on the first optical disc 2a or the second optical disc 2b and for generating focussing error signals FE and tracking error signals TE, as shown in FIG. 4. The first to third light receiving sections 22, 23 and 24 are irradiated with the non-polarization-dependent light beam of the 0th order light and the ±first order light, split by the above-mentioned Wallastone prism 12, while the fourth and fifth light receiving sections 25, 26 are irradiated with the two polarization-dependent light beams of the 0th order light. That is, the four polarization-dependent light beams, split from the ±first order light, are illuminated on an area of the photodetector 21 not provided with the light receiving surface, as shown in FIG. 4, and hence are not used for signal detection.

The first light receiving section 22 has its light receiving surface divided in a cruciform shape into four sections, that is a first light receiving area 22a, a second light receiving area 22b, a third light receiving area 22c and a fourth light receiving area 22d. The first to fourth light receiving areas 22a to 22d are configured for producing output signals A to D based on the received light quantities of the four sections of the light reception surface. The second light receiving section 23 has its light receiving surface divided into two equal portions, that is a first light receiving area 23a and a second light receiving area 23b. The first light receiving area 23a and the second light receiving area 23b are configured for producing output signals E and F based on the respective received light quantities. The third light receiving section 24 has its light receiving surface divided into two equal portions, that is a first light receiving area 24a and a second light receiving area 24b. The first a first light receiving area 24a and the second light receiving area 24b are configured for producing output signals G and H based on the respective received light quantities. The fourth light receiving section 25 and the fifth light receiving sections 26 are configured for producing output signals I and J, based on respective received light quantities, for generating the information signals RE recorded on the first optical disc 2a or the second optical disc 2b.

The focussing error signals FE are obtained from the output signals A to D of the photodetector 21, using the astigmatic method, in accordance with the following formula:

$$FE=(A+C)-(B+D) \quad (4).$$

The tracking error signals TE are obtained from the output signals A to G of the photodetector 21, using the push-pull method, in accordance with the following formula:

$$TE=\{(A+B)-(C+D)\}+\{(F-E)+(H-G)\}\cdot\alpha \quad (5)$$

where α is a gain.

The information signals (RE) is obtained from the output signals I and J of the photodetector 21 by the following formulas (6-1) and (6-2).

Specifically, if the first optical disc 2a and the second optical disc 2b are read-only optical discs or are provided with phase-change type signal recording layers, the information signals RE are obtained in accordance with the formula (6-1):

$$RF=(I+J) \quad (6\text{-}1).$$

If the first optical disc 2a and the second optical disc 2b are magneto-optical discs, the information signals RE are obtained in accordance with the formula (6-2):

$$RF=(I-J) \quad (6\text{-}2).$$

The photodetector 21 may be provided only with the first to third light receiving sections 22 to 24, without providing the fourth and fifth light receiving sections 25, 26. In this case, the information signals RF may be obtained by summing the output signals A to D from the first to third light receiving sections 22 to 24.

If, in the optical pickup device 1, the first optical disc 2a is used as a recording medium, the information signals are reproduced substantially as follows:

If the first semiconductor laser 3a is driven to radiate the first light beam L1, the first light beam L1 is incident on the first diffraction grating 5a in the state of the diffused light and split by the first diffraction grating 5a into the 0th order light and the ±first order light so as to be deflected by the light polarizing film 4a of the dichroic beam splitter 4. The first light beam L1 is collimated by the collimator lens 6 to fall on the beam splitter 7. In the first light beam L1, collimated by the collimator lens 6, 70 to 80% of the P polarization component is transmitted through the light polarizing film 7a of the beam splitter 7. The first light beam L1 then falls on the dichroic hologram 8. The dichroic hologram 8 transmits not less than 70% of the first order light and limits the aperture of the objective lens 9 to correct the spherical aberration produced due to the first optical disc 2a being thicker than the second optical disc 2b. The first light beam L1 is converged by the objective lens 9 on the signal recording surface of the first optical disc 2a to form a beam spot of a suitable diameter.

The first return light beam L1, reflected by the signal recording surface of the first optical disc 2a, falls on the beam splitter 7 via the objective lens 9 and the dichroic hologram 8. Since the transmission ratio Tp of the S polarization component of the beam splitter 7 is 0% to 10%, the beam splitter 7 reflects 90% to 100% of the S polarization component of the light beam L1, while deflecting the reflected light by 90°. The first return light beam L1 falls on the dichroic phase compensation plate 11 where the P polarization component and the S polarization component are corrected for phase difference. The three diffracted light beams of the light beam L1 are split by the Wallastone prism 12 into three beams. The first return light beam L1 is converged by the light converging lens 13 so as to be received via multiple lens 14 by the photodetector 15 or by the photodetector 21.

If the photodetector 15 is used, the non-polarization-dependent light beam of the 0th order light of the first light beam L1 falls on the light receiving section 16 of the photodetector 15. The output signals A to D derived from the light beam L1 are routed to a controller for the optical pickup device 1 to generate the focussing error signals FE by the astigmatic method shown by the formula 1. On the second and third light receiving sections 17, 18, the non-polarization-dependent light beam of the ±first order light of the first light beam L1 is incident and the output signals E and F derived from this light beam are routed to the controller to generate the tracking error signals TE by the three-spot method of the formula 2. On the fourth and fifth light receiving sections 19, 20, the polarization-dependent light beam of the 0th order light of the first light beam L1 is incident and the output signals I and J derived from this light beam are routed to the controller. If the first optical disc 2a is the read-only optical disc or a phase-change optical disc, the information signals recorded on the first optical disc 2a are generated by summing the output signals I and J as indicated by the above formula 3-1. If the first optical disc 2a is the magneto-optical disc, the information signals recorded on the first optical disc 2a are generated by subtracting the output signal J from the output signal I as indicated by the above formula 3-1.

The focussing error signals FE and the tracking error signals TE are sent to the objective lens driving unit which then performs focussing control and tracking control of the objective lens 9 based on the focussing error signals FE and the tracking error signals TE.

If the photodetector 21, arranged as shown in FIG. 4, is used, the non-polarization-dependent light beam of the first light beam L1 falls on the first light receiving section 22, and resulting output signals A to D are sent to the controller of the optical pickup device 1 to generate focussing error signals FE by the astigmatic method shown by the formula 4. The non-polarization-dependent light beam of the +first order light of the first light beam L1 falls on the second light receiving section 23 and the resulting output signals E and F are sent to the controller. The non-polarization-dependent light beam of the −first order light of the first light beam L1 is incident on the third light receiving section 24 and the resulting output signals G and H are sent to the controller. The controller causes the tracking error signals TE to be generated by the push-pull method shown by the formula 5 based on the output signals A to D from the first light receiving section 22 and on the output signals G and H of the third light receiving section 24. The fourth and fifth light receiving sections 25, 26 are irradiated with polarization-dependent light beams of the 0th order light of the first light beam L1 and the resulting output signals I and J are routed to the controller. If the first optical disc 2a is the read-only optical disc or a phase-change optical disc, the information signals recorded on the first optical disc 2a are generated by summing the output signals I and J as indicated by the above formula 6-1. If the first optical disc 2a is the magneto-optical disc, the information signals recorded on the first optical disc 2a are generated by subtracting the output signal J from the output signal I as indicated by the above formula 6-1.

The focussing error signals FE and the tracking error signals TE are sent to the objective lens driving unit which then performs focussing control and tracking control of the objective lens 9 based on the focussing error signals FE and the tracking error signals TE.

For recording information signals on the first optical disc, the laser output of the first semiconductor laser 3a is made larger than if the information signals are to be reproduced to output the first light beam L1 of a larger laser power. The first light beam L1, with the enlarged laser power, is illuminated on the signal recording surface of the first optical disc 2a to record information signals by traversing the path similar to that for the reproduction, that is through the first diffraction grating 5a, dichroic beam splitter 4, collimator lens 6, beam splitter 7, dichroic hologram 8 and the objective lens 9. The first return light beam L1 is passed through the objective lens 9, dichroic hologram 8, beam splitter 7, dichroic phase compensation plate 11, Wallastone prism 12, light converging lens 13 and the cylindrical lens 14 to fall on the photodetector 15 or an the photodetector 21, as in the case of reproduction, to record information signals as the focussing control and tracking control of the objective lens 9 are carried out based on the focussing error signals and the tracking error signals obtained on detecting the return light beam.

The optical pickup device 1 also reproduces information signals recorded on the second optical disc 2b substantially as follows:

When the second light beam L2 is radiated from the second semiconductor laser 3b, this second light beam L2 falls on the second diffraction grating 5b in the diffused light state where it is split into the 0th order light and ±first order light and transmitted in this state through the dichroic beam splitter 4. The second light beam L2 is collimated by the collimator lens 6 to fall on the beam splitter 7. The second light beam L2, collimated by the collimator lens 6, is transmitted through the light polarizing film 7a of the beam splitter 7 at a rate of 70% to 80% of the P polarization component of the second light beam L2 to fall on the dichroic hologram 8. The dichroic hologram 8 permits transmission therethrough of not less than 90% of the 0th order light of the second light beam L2. By the objective lens 9, the second light beam L2 is converged to an optimum beam spot diameter on the signal recording surface of the second optical disc 2b.

The second return light beam L2, reflected back from the signal recording surface of the second optical disc 2b, is passed through the objective lens 9 and the dichroic hologram 8 to fall on the beam splitter 7. Since the beam splitter 7 has the transmission ratio of the S polarization component of 0% to 10%, it reflects 90% to 110% of the S polarization component of the first light beam L1 on its light polarizing film 7a to deflect the light by 90°. The second return light beam L2 falls on the dichroic phase compensation plate 11 where the phase difference between the P polarization component and the S polarization component is corrected. In the Wallastone prism 22, three diffracted light beams are split into nine beams. The second return light beam L2 is converged by the light converging lens 13 so as to be received via multiple lens 14 by the photodetector 15 or 21.

If the above-mentioned photodetector 15 is used, the photodetector 15 is irradiated with the non-polarization-dependent light beam of the 0th order light of the second light beam L2, illuminated on the first light receiving section 16 to generate output signals A to D which are then routed to the controller of the optical pickup device 1 to produce focussing error signals FE by the astigmatic method shown by the above formula 1. The second and third light receiving sections 17, 18 are irradiated with the non-polarization-dependent light beam of the ±first order light of the second light beam L2 to generate resulting output signals E and F which then are routed to the controller to generate tracking error signals TE by the three-spot method shown by the above formula 2. The fourth and fifth light receiving sections 19 and 20 are irradiated with the polarization-dependent light beam of the 0th order light of the second light beam L2. Output signals I and J, obtained on detecting the light beam, are routed to the controller. If the second optical disc 2b is a read-only optical disc or a phase-change optical disc, the output signals I and J are summed together, as shown by the above formula 3-1, to generate information signals recorded on the second optical disc 2b. If the second optical disc 2b is the magneto-optical disc, the output signal J is subtracted from the output signal I, as shown by the above formula 3-2, to generate information signals recorded on the second optical disc 2b.

The focussing error signals FE and the tracking error signals TE are routed to an objective lens driving unit, which then performs focussing control and tracking control of the objective lens 9 based on the focussing error signals FE and the tracking error signals TE.

If the above-mentioned photodetector 21 shown in FIG. 4 is used, the non-polarization-dependent light beam of the 0th order light of the second light beam L2 incident on the first light receiving section 22 falls on the photodetector 21. Output signals A to D derived from this light beam are routed to the controller for the optical pickup device 1 to generate focussing error signals FE by the astigmatic method shown by the above formula 4. The non-polarization-dependent light beam of the −first light is illuminated on the third light receiving section 24. Output signals E, F derived from the light beam are routed to the controller. The third light receiving section 24 is irradiated with the non-polarization-dependent light beam of the −first order light. Output signals G and H derived from the light beam are routed to the controller. In this controller, tracking error signals TE are generated from the output signals A to D of the first light receiving section 22, output signals E and F from the second light receiving section 23 and the output signals G and H of the third light receiving section 24, in accordance with the push-pull method shown by the above formula 5. The polarization-dependent light beam of the 0th order light of the second light beam L2 falls on the fourth and fifth light receiving sections 25, 26 and output signals derived from the light beam are routed to the controller. If the second optical disc 2b is a read only optical disc or a phase-change optical disc, the output signals I and J are summed together, as shown by the above formula 6-1, to generate information signals recorded on the second optical disc 2b. If the second optical disc 2b is the magneto-optical disc, the output signal J is subtracted from the output signal I, as shown by the above formula 6-2, to generate information signals recorded on the second optical disc 2b.

The focussing error signals FE and the tracking error signals TE are routed to an objective lens driving unit, which then performs focussing control and tracking control of the objective lens 9 based on the focussing error signals FE and the tracking error signals TE.

For recording information signals on the first optical disc, the laser output of the first semiconductor laser 3b is made larger than if the information signals are to be reproduced so as to output the second light beam L2 of a larger laser power. The second light beam L2, with the enlarged laser power, is illuminated on the signal recording surface of the second optical disc 2b to record information signals by traversing the path similar to that for the reproduction, that is through the first diffraction grating 5a, dichroic beam splitter 4, collimator lens 6, beam splitter 7, dichroic hologram 8 and the objective lens 9. The second return light beam L2 is passed through the objective lens 9, dichroic hologram 8, beam splitter 7, dichroic phase compensation plate 11, Wallastone prism 12, light converging lens 13 and the cylindrical lens 14 to fall on the photodetector 15 or on the photodetector 21, as in the case of reproduction, to generate focussing error signals and tracking error signals. The optical pickup device 1 records information signals as the focussing control and tracking control of the objective lens 9 are performed based on the focussing error signals and the tracking error signals.

With the optical pickup device 1 according to the present invention, all component parts can be used in common except the first and second semiconductor lasers 3a, 3b radiating the first and second light beams L1, L2 and associated first and second diffraction gratings 5a, 5b, such that the common optical path can be used for the first and second light beams L1, L2 downstream of the dichroic beam splitter 4. Thus, information signals can be recorded or reproduced reliably for the first optical disc 2a and for the second optical disc 2b, despite the fact that device 1 itself can be simplified in structure and reduced in size.

Moreover, with the optical pickup device 1 according to the present invention, since the dichroic hologram 8 is used as a member for limiting the aperture and for correcting the spherical aberration of the objective lens 9, the device 1 can be further simplified in structure and reduced in size.

Figure 5:
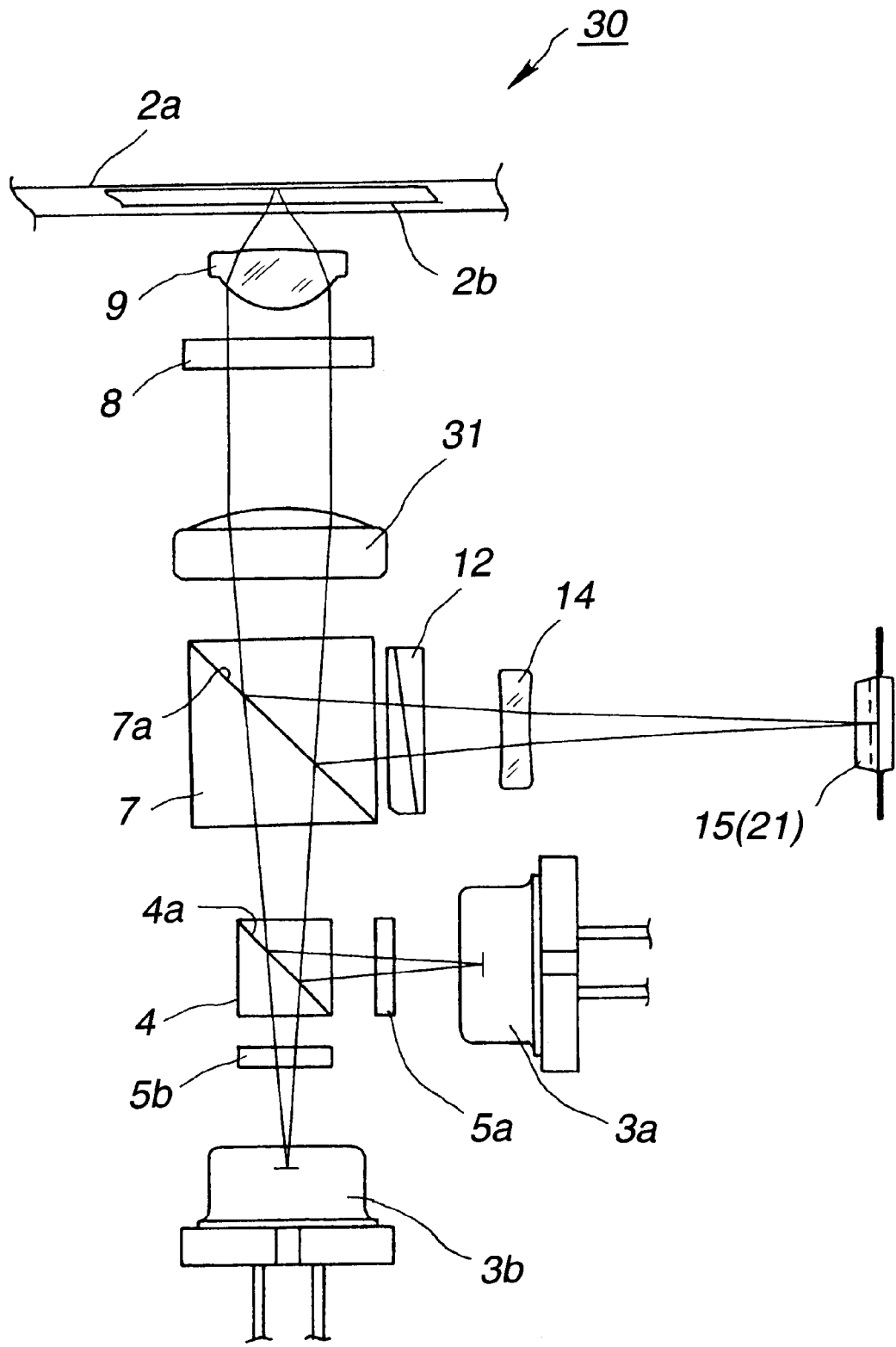
FIG. 5 is a side view showing a second embodiment of an optical pickup device according to the present invention.

Referring to FIG. 5, a second embodiment of an optical pickup device 30 according to the present invention is explained.

In the following description, the parts of components which are the same as those of the optical pickup device 1 of the first embodiment are depicted by the same reference numerals and are not explained specifically.

This optical pickup device 30 includes a first semiconductor laser 3a for radiating the first light beam L1 and a second semiconductor laser 3b for radiating the second light beam L2. The first and second semiconductor lasers 3a, 3b are arranged so that the optical axes of the first light beam L1 and the second light beam L2 emitted thereby will cross each other. At a crossing point of the first and second light beams L1, L2, there is provided a dichroic beam splitter 4 for deflecting the first light beam L1 radiated by the first semiconductor laser 3a by 90° and for transmitting the second light beam L2 radiated by the second semiconductor laser 3b. The dichroic beam splitter 4 deflects the first light beam L1 radiated by the first semiconductor laser 3a by 90° and transmits the second light beam L2 radiated from the second semiconductor laser 3b to equate the optical path of the first light beam L1 to that of the second light beam L2.

A first diffraction grating 5a is provided between the dichroic beam splitter 4 and the first semiconductor laser 3a, while a second diffraction grating 5b is provided between the dichroic beam splitter 4 and the second semiconductor laser 3b. The first diffraction grating 5a splits the first light beam L1 radiated from the first semiconductor laser 3a at equal intervals into at least three diffracted light beams of 0th order light and ±first order light. In FIG. 5, the three diffracted light beams are represented as a sole light beam and, in agreement with the illustration in the drawing, these three beams are simply referred to as a light beam.

The optical pickup device 1 of the second embodiment includes, looking from the light source side, a beam splitter 7, a collimator lens 31 for collimating the first and second light beams L1, L2 from the beam splitter 7, a dichroic hologram 8 for limiting the aperture and correcting the spherical aberration of the objective lens 9 with respect to the light beam L1 from the collimator lens 31, and the objective lens 9 for converging the first and second light beams L1, L2 for illuminating the converged light beams on the signal recording surfaces of the first optical disc 2a and the second optical disc 2b. The beam splitter 7 has substantially the same transmittance and reflectance for the first and second light beams L1, L2 of different wavelengths.

The beam splitter 7 transmit the first and second light beams L1, L2 from the dichroic beam splitter 4 to permit the transmitted light beams to fall on the objective lens 9 and on the first optical disc 2a or on the second optical disc 2b, while reflecting the first and second return light beams L1, L2 by 90° to permit the deflected light beams to be illuminated on the photodetector 15 or 21. That is, the beam splitter 7 has substantially the same transmittance and reflectance for the first and second light beams L1, L2 of different wavelengths.

The collimator lens 31 collimates the first and second light beams L1 L2 from the beam splitter; 7 and converges the first and second return light beams L1, L2 reflected back from the signal recording surfaces of the first optical disc 2a and the second optical disc 2b.

With the optical pickup device 30 of the second embodiment, in which the collimator lens 31 is arranged between the objective lens 9 and the beam splitter 7, adapted for separating the light beam radiated from the first or second light source 3a or 3b from the light beam reflected back from the first optical disc 2a or the second optical disc 2b, there is no necessity of providing a light converging lens 13 in the optical path of the return light beam, reflected by the first optical disc 2a or the second optical disc 2b and separated by the beam splitter 7, thus enabling the number of component parts to be reduced to simplify the structure and reduce the size of the device.

The first and second light beams L1, L2, radiated by the first light source 3a or the second light source 3b and transmitted through the collimator lens 31, are converged via the dichroic hologram 8 by the objective lens 9 so as to be radiated on the signal recording surface of the first optical disc 2a or the second optical disc 2b. The first and second return light beams L1, L2, reflected by the first optical disc 2a or the second optical disc 2b, fall on the beam splitter 7, via the objective lens 9, dichroic hologram 8 and the collimator lens 31, and are deflected 90° to fall on the photodetector 15 or 21. The optical pickup device 30 includes, looking from the beam splitter 7, a Wallastone prism 12, for splitting the first and the second light beams L1, L2, depending on the direction of polarization of the first and second light beams L1, L2, a multiple lens 14 for producing astigmatic aberration in the first and second light beams L1, L2 and a photodetector 15 or 21 on which fall the first and second light beams L1, L2 from the multiple lens 14. The first and second return light beams L1, L2, separated by the beam splitter 7, fall on the photodetector 15, arranged as shown in FIG. 3, or the photodetector 21, arranged as shown in FIG. 4, via the Wallastone prism 12 and the multiple lens 14.

The optical pickup device 30, constructed as described above, reproduces the information signals, recorded on the first optical disc 2a, substantially as follows:

If the first semiconductor laser 3a is driven to radiate the first light beam L1, the first light beam L1 falls on the first diffraction grating 5a in the state of the diffused light. The light beam is then split in the first diffraction grating 5a into the 0th order light and ±first order light, and then is deflected by 90° by the light polarizing film 4a of the dichroic beam splitter 4. The first light beam L1 is transmitted at a rate of 70% to 80% of the P polarization component through the beam splitter 7 to fall on the collimator lens 31. The light beam is converted by the collimator lens 31 from the diffused light into the collimated light. The first light beam L1, thus collimated, falls on the dichroic hologram 8, where not less than 70% of the first order light is transmitted. The dichroic hologram 8 limits the aperture of the objective lens 9 to correct the spherical aberration caused by the substrate of the first optical disc 2a being thicker in thickness than the substrate of the second optical disc 2b. The first light beam L1 is converged by the objective lens 9 to an optimum beam spot size on the signal recording surface of the first optical disc 2a.

The first return light beam L1, reflected by the signal recording surface of the first optical disc 2a, falls on the collimator lens 31 via the objective lens 9 and the dichroic hologram 8 so as to be converged by the collimator lens 31 operating similarly to the light converging lens 13 of the optical pickup device 1 of the first embodiment described above. The converged return first light beam L1 falls on the beam splitter 7 whereby 90% to 110% of the S polarization component is reflected and deviated 90° by the operation of the light polarizing film 7a of the beam splitter 7. The first return light beam L1 is split by the Wallastone prism 22 from the state of three diffracted light beams into nine beams which are received via multiple lens 14 by the photodetector 15 or 21.

The photodetector 15 or 21 furnishes output signals to a controller performing control for the optical pickup device 30. The controller generates, based on the output signal of the photodetector 15 or 21, the focussing error signals by the astigmatic method shown by the formula 1 or 4, while generating tracking error signals by the three-spot method of the formula 3 or the push-pull method of formula 5. The generated focussing error signals and tracking error signals are sent to an objective lens driving unit. The objective lens driving unit performs focussing control and tracking control based on the focussing error signals FE and the tracking error signals TE. The controller performs control so that, if the second optical disc 2b is a read-only optical disc or a phase-change optical disc, the output signals I and J are summed together, as shown by the above formula 3-1 or 6-1, to generate information signals recorded on the second optical disc 2b. If the second optical disc 2b is the magneto-optical disc, the output signal J is subtracted from the output signal I, as shown by the above formula 3-2 or 6-2, to generate information signals recorded on the second optical disc 2b.

For recording information signals on the first optical disc 2a, the laser output of the first semiconductor laser 3a is made larger than if the information signals are to be reproduced, in order to output the first light beam L1 of a larger laser power. The first light beam 2a, with the enlarged laser power, is illuminated on the signal recording surface of the first optical disc 2a to record information signals thereon by traversing the path similar to that for the reproduction, that is through the first diffraction grating 5a, dichroic beam splitter 4, beam splitter 7, collimator lens 31, dichroic hologram 8 and the objective lens 9. The first return light beam L1 is passed through the objective lens 9, dichroic hologram 8, collimator lens 6, beam splitter 7, Wallastone prism 12 and the cylindrical lens 14 to fall on the photodetector 15 or on the photodetector 21, as in the case of reproduction, to generate focussing error signals and tracking error signals, based on the detection output of the photodetector 15 or 21. The optical pickup device 1 records information signals as the focussing control and tracking control of the objective lens 9 are performed based on the focussing error signals and the tracking error signals.

The optical pickup device 30 reproduces the information, recorded on the second optical disc 2b, substantially as follows:

If the second light beam L2 is radiated from the second semiconductor laser 3b, the second light beam L2 falls in the state of the diffused light on the second diffraction grating 5b, where it is split into the 0th order light and the ±first order light and transmitted in this state through the dichroic beam splitter 4. The P polarization component of the second light beam L2 is transmitted at a rate of 70% to 80% through the beam splitter 7 to fall on the collimator lens 31 where it is collimated from the state of the diffused light. The second light beam L2, thus collimated, falls on the dichroic hologram 8 where not less than 90% of the 0th order light is transmitted. The second light beam L2 is converged by the objective lens 9 and illuminated on the signal recording surface of the optical disc 2b with a suitable beam spot diameter. The second return light beam L2, reflected on the signal recording surface of the second optical disc 2b, falls on the collimator lens 31 via the objective lens 9 and the dichroic hologram 8 so as to be converged by the collimator lens 31, which operates similarly to the first light converging lens 13 of the optical pickup device 1 described above. The converged second return light beam L2 falls on the beam splitter 7 where 90% to 110% of the S polarization component of the second light beam L2 is reflected and deviated by 90° by the light polarizing film 7a of the beam splitter 7. The second return light beam L2 is split by the Wallastone prism 22 from the state of three diffracted light beams to nine light beams which then are received via multiple lens 14 by the photodetector 15 or 21.

A detection output of the photodetector 15 or 21 furnishes an output signal for the controller performing the control for the optical pickup device 30. The controller performs control to generate focussing signals by the astigmatic method shown by the formula 1 or 4, as well as to generate tracking error signals by the three-spot method shown by the formula 2 or the push-pull method shown by the formula 5, based on the output signal of the photodetector 15 or 21, to send the tracking error signals and the focussing error signals to the objective lens driving unit. Based on the focussing error signals and the tracking error signals, the objective lens driving unit displaces the objective lens 9, to perform focussing control and tracking control. The controller performs control so that, if the second optical disc 2b is a read-only optical disc or a phase-change optical disc, the output signals I and J are summed together, as shown by the above formula 3-1 or 6-1, to generate information signals recorded on the second optical disc 2b. If the second optical disc 2b is the magneto-optical disc, the output signal J is subtracted from the output signal I, as shown by the above formula 3-2 or 6-2, to generate information signals recorded on the second optical disc 2b.

For recording information signals on the first optical disc 2a, the laser output of the second semiconductor laser 3b is made larger than if the information signals are to be reproduced, in order to output the second light beam L2 of a larger laser power. The first light beam 2a, with the enlarged laser power, is illuminated on the signal recording surface of the second optical disc 2b to record information signals thereon by traversing the path similar to that for the reproduction, that is through the second diffraction grating 5a, dichroic beam splitter 4, beam splitter 7, collimator lens 31, dichroic hologram 8 and the objective lens 9. The second return light beam L2, reflected by the signal recording surface of the second optical disc 2b, is passed through the objective lens 9, dichroic hologram 8, collimator lens 6, beam splitter 7, Wallastone prism 12 and the cylindrical lens 14 to fall on the photodetector 15 or on the photodetector 21, as in the case of reproduction, to generate focussing error signals and tracking error signals, based on the detection output of the photodetector 15 or 21. The optical pickup device 1 records information signals as the focussing control and tracking control of the objective lens 9 are performed based on the focussing error signals and the tracking error signals.

With the optical pickup device 30 according to second embodiment of the present invention, all component parts can be used in common for the first and second light beams L1, L2, except the first and second semiconductor lasers 3a, 3b radiating the first and second light beams L1, L2 and associated first and second diffraction gratings 5a, 5b, such that the common optical path can be used for the first and second light beams L1, L2. Thus, information signals can be recorded or reproduced reliably for the first optical disc 2a and for the second optical disc 2b, while the device 1 itself can be simplified in structure and reduced in size.

Moreover, with the optical pickup device 1 according to the present invention, since the dichroic hologram 8 is used as a member for limiting the aperture and for correcting the spherical aberration of the objective lens 9, the device 1 can be further simplified in structure and reduced in size.

Also, with the optical pickup device 30, the collimator lens 31 is endowed with the function of collimating the first and second light beams L1, L2 from the beam splitter 7 and converging the first and second return light beams L1, L2 reflected back from the signal recording surfaces of the first optical disc 2a and the second optical disc 2b, so that there is no necessity of providing a light converging lens 13 as in the optical pickup device 1, thus reducing the number of component parts. Moreover, the device can be reduced further in size and manufactured inexpensively.

In the above-described optical pickup devices 1, 30, the first semiconductor laser 3a radiating the first light beam L1 is arranged on the right side of FIGS. 1 and 4 for crossing the optical axis of the objective lens 9, while the second semiconductor laser 3b radiating the second light beam L2 is arranged on the lower side in FIG. 4 in parallel with the optical axis of the objective lens 9. However, in the optical pickup devices 1, 30, a reverse arrangement may be used, that is, the second semiconductor laser 3b and the first semiconductor laser 3a may be arranged for crossing the optical axis of the objective lens 9 and for extending parallel to the optical axis of the objective lens 9 on the lower side in FIGS. 1 and 4, respectively. In this case, the dichroic beam splitter 4 may be arranged so that its light polarizing film 4a has the transmittance of approximately 110% to the first light beam L1 radiated by the first semiconductor laser 3a and the reflectance of approximately 110% to the second light beam L2 radiated by the second semiconductor laser 3b for deflecting the second light beam L2 by 90°.

Industrial Applicability

In the optical pickup device and the optical disc recording and/or reproducing apparatus, employing the optical pickup device, according to the present invention, there is provided a hologram for limiting the aperture for the first light beam or the second light beam selectively recording and/or reproducing first and second optical discs having different recording densities, and for correcting the spherical aberration. Thus, the components other than the light source, such as objective lens, beam splitter or the hologram, can be used in common to simplify and reduce the size of the device.

What is claimed is:

1. An optical pickup device comprising:
a first light source for radiating a first light beam having a wavelength of approximately 780 nm;
a second light source for radiating a second light beam having a wavelength of approximately 410 nm;
an objective lens for converging the light beam radiated by the first light source or the light beam radiated by the second light source;
a beam splitter having a substantially equal transmittance to the light beam radiated by the first light source and to the light beam radiated by the second light source and adapted for separating the light beam radiated by the first light source or the light beam radiated by the second light source from the first light beam or the second light beam incident via the objective lens, wherein the beam splitter transmits 70% to 80% of a P polarization component of the first light beam and the second light beam and transmits 0% to 10% of an S polarization component of the first light beam and the second light beam;
a hologram element having wavelength selectivity which is arranged between the objective lens and the beam splitter for limiting the aperture of the first light beam or the second light beam and for correcting a spherical aberration;
a phase compensation element for compensating a phase difference between the P polarization component and the S polarization component of the first light beam and the second light beam incident via the objective lens and separated by the beam splitter; and
a photodetector for receiving the first light beam or the second light beam transmitted through the phase compensation element, wherein
$0^{th}$ order light beams emitted from the first light source and the second light source are used for recording and reproducing data on a plurality of media having different thicknesses, and ±1 order light beams from the first light source and the second light source are used for detecting errors for focusing and tracking control.

2. The optical pickup device according to claim 1 wherein the beam splitter has a phase difference between the P and S polarization components in the wavelengths of the first light beam and the second light beam not larger than 10°.

3. The optical pickup device according to claim 1 further comprising:

a diffraction grating for generating at least three diffraction light beams from the light beam radiated by the first light source or the second light source.

4. The optical pickup device according to claim 3 wherein the photodetector includes a first light receiving section for receiving a main beam of the first or second light beam and second and third light receiving sections for receiving two sub-beams of the first or second light beam.

5. The optical pickup device according to claim 1 further comprising:

a further beam splitter arranged on an optical path between the first and second light sources and the beam splitter for reflecting one of the first light beam radiated by the first light source and the second light beam radiated by the second light source and for transmitting the non-reflected light beam.

6. The beam splitter according to claim 1 having a transmittance of 70% to 80% for P polarization components of a first light beam having a wavelength of approximately 780 nm and a second light beam having a wavelength of approximately 410 nm and a transmittance of 0% to 10% for S polarization components thereof.

7. An optical disc recording and/or reproducing apparatus comprising an optical pickup device, the optical pickup device including:

a first light source for radiating a first light beam having a wavelength of approximately 780 nm;

a second light source for radiating a second light beam having a wavelength of approximately 410 nm;

an objective lens for converging the light beam radiated by the first light source or the light beam radiated by the second light source on a signal recording surface of a first optical disc or on a second optical disc having different respective substrate thicknesses via the substrates of the first optical disc or the second optical disc;

a beam splitter having a substantially equal transmittance to the light beam radiated by the first light source and to the light beam radiated by the second light source and adapted for separating the light beam radiated by the first light source or the light beam radiated by the second light source from the first light beam or the second light beam incident via the objective lens, wherein the beam splitter transmits 70% to 80% of a P polarization component of the first light beam and the second light beam and transmits 0% to 10% of an S polarization component of the first light beam and the second light beam;

a hologram element having wavelength selectivity which is arranged between the objective lens and the beam splitter for limiting the aperture of the first light beam or the second light beam and for correcting spherical aberration due to the difference in substrate thickness between the first and second optical discs;

a photodetector for receiving the first light beam or the second light beam reflected by the signal recording surface of the first optical disc or the signal recording surface of the second optical disc to fall on the objective lens to be separated by the beam splitter;

focusing error signal generating means for generating focusing error signals based on an output signal from the photodetector; and tracking error signals generating means for generating tracking error signals based on an output signal from the photodetector, wherein the photodetector includes a first light receiving section for receiving a main beam of the first or second light beam and second and third light receiving sections for receiving two sub-beams of the first or second light beam, the focusing error generating means processes an output signal from each light receiving section of the photodetector to generate focusing error signals, the tracking error generating means processes output signals of at least the second and third light receiving sections to generate the tracking error signals, and $0^{th}$ order light beams emitted from the first light source and the second light source are used for recording and reproducing data on a plurality of media having different thicknesses, and ±1 order light beams from the first light source and the second light source are used for detecting errors for focusing and tracking control.

8. The recording/and or reproducing apparatus for an optical disc according to claim 7 wherein the beam splitter has a phase difference between the P and S polarization components in the wavelengths of the first light beam and the second light beam not larger than 10°.

9. The recording and/or reproducing apparatus for an optical disc according to claim 7 wherein the optical pickup device further comprises:

a phase compensation element for compensating a phase difference between a P polarization component and an S polarization component of the first light beam or the second light beam incident via the objective lens and separated by the beam splitter.

10. The beam splitter according to claim 9 wherein a phase difference between the P polarization component and the S polarization component in the wavelength of the first light beam and the second light beam is 10% or less.

11. The recording and/or reproducing apparatus for an optical disc according to claim 7 wherein the optical pickup device further comprises:

a diffraction grating for generating at least three diffracted light beams from the first light beam radiated from the first light source and the light beam radiated from the second light source.

12. The recording and/or reproducing apparatus for an optical disc according to claim 7 wherein the optical pickup device further includes:

a second beam splitter arranged on an optical path between the first and second light sources and the beam splitter for reflecting at least one of the first light beam radiated by the first light source and the second light beam radiated by the second light source and for transmitting the non-reflected light beam.

13. The recording and/or reproducing apparatus for an optical disc according to claim 7 wherein the beam splitter has the transmittance of 70% to 80% for a P polarization component of the first light beam and the second light beam and the transmittance of 0% to 10% for an S polarization component of the first light beam and the second light beam.

14. The recording and/or reproducing apparatus for an optical disc according to claim 13 wherein the beam splitter has a phase difference between the P and S polarization components in the wavelengths of the first light beam and the second light beam not larger than 10°.

15. The recording and/or reproducing apparatus for an optical disc according to claim 13 wherein the optical pickup device further comprises:

a phase compensation element for compensating a phase difference between the P polarization component and the polarization component of the first light beam or the second light beam incident via an objective lens and separated by the beam splitter.

* * * * *